(12) United States Patent
Crinklaw et al.

(10) Patent No.: US 11,667,255 B2
(45) Date of Patent: Jun. 6, 2023

(54) SAFETY BUMPER ASSEMBLY AND ROBOTIC VEHICLE COMPRISING THE SAME

(71) Applicant: GUSS Automation LLC, Kingsburg, CA (US)

(72) Inventors: David Crinklaw, Kingsburg, CA (US); Chase Schapansky, Fresno, CA (US); Gary Thompson, Sanger, CA (US)

(73) Assignee: GUSS Automation LLC, Kingsburg, CA (US)

( * ) Notice: Subject to any disclaimer, the term of this patent is extended or adjusted under 35 U.S.C. 154(b) by 439 days.

(21) Appl. No.: 17/063,623

(22) Filed: Oct. 5, 2020

(65) Prior Publication Data

US 2022/0105888 A1    Apr. 7, 2022

(51) Int. Cl.
| | |
|---|---|
| *B60R 19/26* | (2006.01) |
| *B60R 19/32* | (2006.01) |
| *B60R 19/48* | (2006.01) |
| *B60R 19/38* | (2006.01) |
| *B60R 19/28* | (2006.01) |

(52) U.S. Cl.
CPC .............. *B60R 19/26* (2013.01); *B60R 19/28* (2013.01); *B60R 19/32* (2013.01); *B60R 19/38* (2013.01); *B60R 19/483* (2013.01)

(58) Field of Classification Search
CPC ....... B60R 19/023; B60R 19/24; B60R 19/26; B60R 19/32; B60W 30/08
USPC .................................................. 293/117, 118
See application file for complete search history.

(56) References Cited

U.S. PATENT DOCUMENTS

| | | | | |
|---|---|---|---|---|
| 1,755,207 | A * | 4/1930 | Comiskey | B60R 19/26 180/277 |
| 3,947,061 | A * | 3/1976 | Ellis | B60R 19/40 293/118 |
| 6,709,035 | B1 * | 3/2004 | Namuduri | B60R 19/40 293/118 |
| 7,909,373 | B2 * | 3/2011 | Donovan | B60R 19/40 293/133 |
| 11,565,641 | B2 * | 1/2023 | Gayne | B60R 21/013 |
| 2016/0311389 | A1 * | 10/2016 | Sharma | B60R 19/40 |

FOREIGN PATENT DOCUMENTS

| | | | | |
|---|---|---|---|---|
| CN | 108657094 A | * | 10/2018 | ........... B60R 19/023 |
| WO | 2018/044376 A1 | | 3/2018 | |

* cited by examiner

*Primary Examiner* — Jason S Daniels
(74) *Attorney, Agent, or Firm* — WHGC, P.L.C.; Alexander R. Schlee

(57) ABSTRACT

A safety bumper assembly for a vehicle shutting off a vehicle engine when the vehicle hits an obstacle, particularly an autonomous vehicle used for agricultural purposes. The assembly includes bumper shafts holding a bumper bar at a distance from a support structure of the vehicle and shuts off the vehicle engine in such fashion that the vehicle comes to a full stop before the bumper has reached its most inward position closer to the vehicle body. A vehicle equipped with the safety bumper assembly has vehicle frame integrating a support structure of the safety bumper assembly.

15 Claims, 9 Drawing Sheets

SAFETY BUMPER ASSEMBLY AND ROBOTIC VEHICLE COMPRISING THE SAME

BACKGROUND

1. Field of the Invention

The present invention pertains to safety bumper assemblies, in general, and robotic vehicles having such a safety bumper assembly in particular, specifically for autonomous vehicles used as a robotic agricultural spraying equipment.

2. Background Technology

Modern agricultural equipment can be hazardous and labor-intensive to operate. For example, current orchard spraying devices have exposed appendages and exposed moving parts that produce an aerosol of chemicals dangerous for human consumption. This is particularly the case when pesticides and fungicides are being sprayed on the orchard trees. Equipment operators are required to wear confining respirators and goggles to avoid incidental contact with the sprayed agent.

Additionally, current orchard spraying devices can be clumsy and difficult to operate in an environment of a dense tree canopy, where the boughs of the trees hang low and the space between trees is thereby limited. Typical equipment contacts the low-hanging tree boughs and may cause harm to the trees. Also, the operator must be confined in a protective cab to prevent being jabbed and whipped by a low hanging tree canopy. Moreover, operation of modern agricultural equipment can be a slow and tedious affair. Operators must stop periodically to remove their protective gear to rest, hydrate and eat, in addition to other rest stops. As a result, equipment operation progresses in fits and starts, continually limited by exhaustion and injury, governmental restrictions, and basic human needs. What is needed is an automated, robotic agricultural system that obviates the need for the human operators who are at risk by operating existing equipment.

For these reasons, autonomous vehicles are increasingly used in agricultural equipment, specifically for applications that are hazardous and labor-intensive. A robotic agricultural system and method is for instance known from the international patent application published under the publication number WO 2018044376 (A1), the content of which is herewith incorporated by reference. For safe operation, it is particularly important to protect operating personnel and bystanders alike. Further, it is desired to protect the vehicle itself from damage, as well as possible obstacles it may hit. This requires that the autonomous vehicle stops automatically when coming into contact with a person or an object.

A known approach for accomplishing such vehicle stopping and engine shutoff is providing stopping bumpers made of a relatively soft material that is compressed by a force acting between a person or object and the bumper resulting in compression of the soft material that caves in by some distance. The soft material can have either contact strips inside or a use a pressure-induced conductive material wherein the inner padded material itself is the source of electrical conductivity establishing electrical conductivity that can shut off the engine in various ways, for example by actuating a switch or short-circuiting the electric engine ignition. The engine shutdown circuit can be done countless different ways. The vehicle engine can be shut off in many different ways as long as some sort of electrical signal is generated. Depending on how the engine is controlled, this may for example be accomplished by an electrical switch, a mechanical switch or a CAN Bus.

Also other approaches such as tensioning a cable extending on the outside of the vehicle by a contact with an obstacle are known, actuating a switch shutting down the vehicle engine.

While this concept may work for many applications, specifically for slow moving robotic vehicles of low to moderate weight, a problem particularly for heavier autonomous vehicles such as robotic agricultural spraying vehicles is that such soft material safety bumpers can reasonable only be made with limited thickness, say 5-10 inches, for preventing to make the soft material safety bumper too bulky. Further, the entire cave in distance for the soft material is limited, depending on its coefficient of elasticity, which limits structurally not only the useful cave in distance for actuating the stop switch, but more importantly the cave in distance will not be sufficiently long for fully stopping the vehicle before the full cave in distance is reached. As a result, persons, objects and the autonomous vehicle itself still experience some significant impact. This applies particularly for heavier autonomous vehicles as used in robotic agricultural spraying equipment, even if moving just at about pedestrian speed of 2-3 mph. Such vehicles have considerable weight since the spraying requires significant power and in addition the tank holding the spraying agent adds to the weight.

It is therefore desirable to control the forces acting between the person or object and the vehicle upon contact from the first contact all the way to the full stopping of the autonomous vehicle.

SUMMARY OF THE INVENTION

According to a first aspect of the invention, a safety bumper assembly for a vehicle shuts off a vehicle engine when the vehicle hits an obstacle, said safety bumper assembly comprising: a bumper bar; at least a first bumper shaft and a second bumper shaft, each of which having an outer bumper shaft portion with an outer shaft end and an inner bumper shaft portion spaced from the outer bumper shaft portion and having an inner shaft end, wherein said outer bumper shaft portion and inner bumper shaft portion are hinged to the bumper bar; a support structure accommodating the at least first and second bumper shafts at their respective inner bumper shaft portions in a movable fashion; a first resistance element biasing the first bumper shaft and a second resistance element biasing the second bumper shaft to respective outermost positions where said outer bumper shaft ends are spaced by a first distance from the support structure; and a switch actuated by inward movement of at least one of the first and second bumper shafts when at least one of the outer bumper shaft ends of the least one of the first and second bumper shafts has reached an inner position that is located at a second distance from the support structure that is shorter than said first distance; wherein the first bumper shaft and the second bumper shaft are movable relative to each other.

According to a second aspect of the invention, a vehicle comprising the safety bumper assembly of the aforementioned first aspect of the invention is provided, wherein the vehicle further comprises a vehicle engine; a vehicle frame supporting vehicle wheels; and a vehicle front where the safety bumper assembly is attached in such a position that the bumper bar forms the frontmost vehicle portion when at least one of the a first bumper shaft and second bumper shaft assumes its outermost position; wherein the support structure is integrated into the vehicle frame.

According to a third aspect of the invention, a method of operating a vehicle as described in the second aspect of the invention comprises: upon the bumper bar contacting an obstacle, actuating a switch shutting off the vehicle engine, wherein the switch is actuated by inward movement of at least one of the first and second bumper shafts when at least one of the outer bumper shaft ends of the least one of the first and second bumper shafts has reached an inner position that is located at a second distance from the support structure that is shorter than said first distance; and stopping the vehicle in its entirety before a respective one of the outer bumper shaft ends of the at least one of said first and second bumper shafts has reached its innermost position.

DETAILED DESCRIPTION OF THE DRAWINGS

Figure 1:
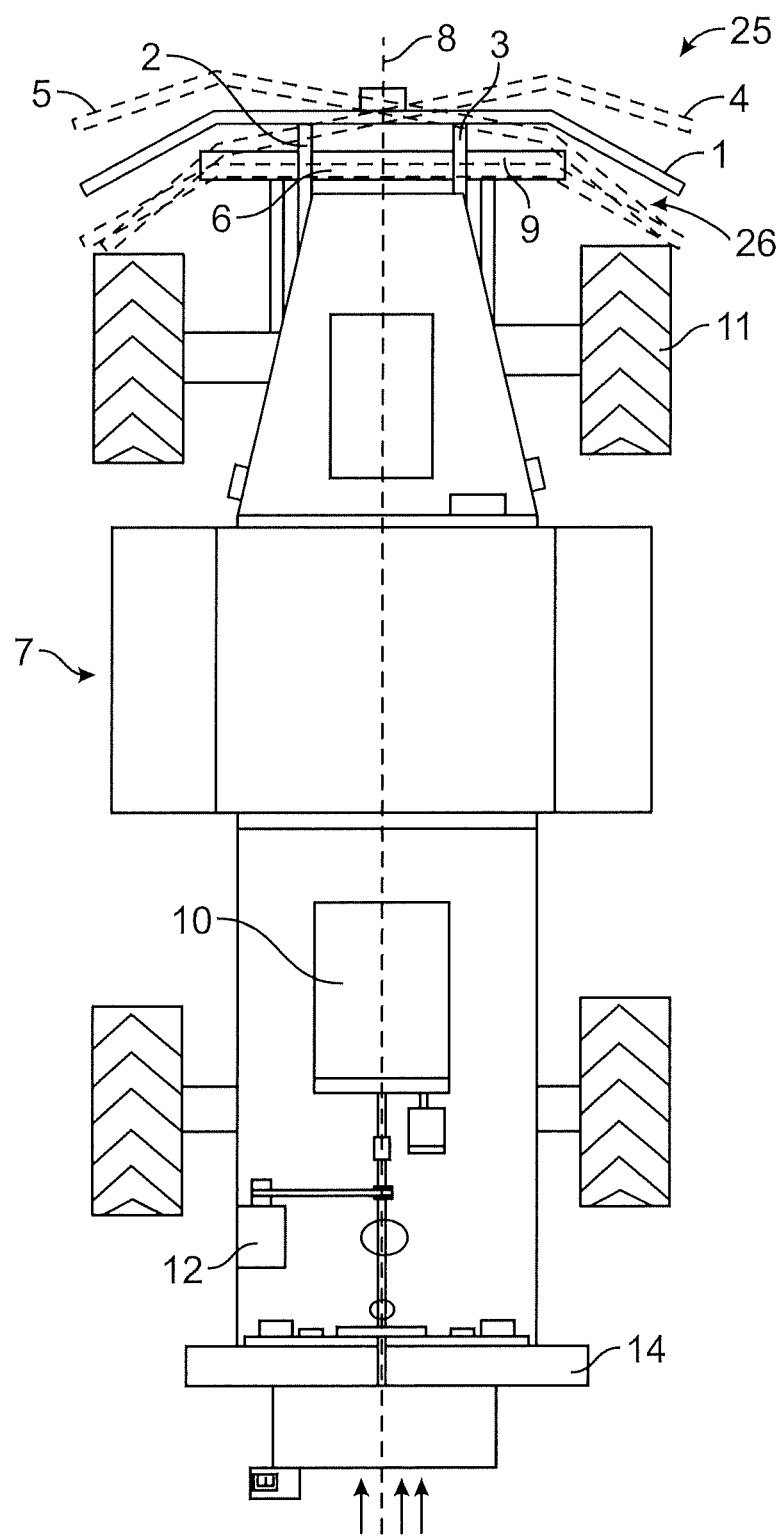
FIG. 1 shows schematically a plan view of a vehicle with a safety bumper assembly according to the invention.

FIG. 1 schematically shows a top view of an autonomous vehicle, in this example a robotic agricultural spraying vehicle 7. At the front of the vehicle, in solid lines, the bumper bar 1 is shown in its foremost, neutral position without any external forces acting on the bumper bar, for instance during normal operation without any contact between the bumper bar and an object. The bumper bar 1 is hinged to the first bumper shaft 2 and a second bumper bar shaft 3. The hinging mechanism will be explained further below in connection with more detailed views of the bumper assembly mechanism. The interrupted lines show various possible positions of the bumper bar 1.

The various positions are denoted by reference numerals 4, 5 and 6. Reference numeral 4 illustrates a bumper bar position where an obstacle is hit substantially on the left side of the vehicle with the first bumper shaft 2 assuming its innermost position while the second bumper shaft 3 remains in its outermost position. This means that only the first bumper shaft 2 is pushed inwards, for instance against a resistance force which could be generated by a pressurized gas struts, coil springs, or constant-force springs. In the embodiment shown, a first gas strut 20 and a second gas strut 21 are used, biasing the respective bumper shafts 2 and 3 forward. Since the contact is on the left side of the vehicle 7, the main force is transmitted via the bumper bar 1 to the first bumper shaft 2. Also some force is transmitted to the second bumper shaft 3. Depending on how great that force is, the second bumper shaft might not be pushed inwards at all, namely if the force is too low to overcome the resistance force by the gas struts 20 and 21 biasing the first and second bumper shafts forward. The bumper bar might be allowed to abut against the left wheel which would therefore provide a soft stop. However, as further discussed below, the stop can also be implemented in addition or in the alternative through the bumper shaft abutting against a stop.

Position 5 shows the opposite position in interrupted lines, mirroring position 4 for the case when the bumper bar is hit by the object predominantly on the outer right side of the bumper bar 1 and therefore the second bumper shaft 3 is pushed inwards while the first bumper shaft 2 remains substantially biased to its outermost position.

Bumper bar position 6 shown in interrupted lines demonstrates the scenario where the object hits the bumper bar 1 approximately in its center, meaning in the vicinity of the centerline 8 of the vehicle 7 and with it the centerline of the bumper bar 1 that is in this embodiment mounted centrally and is symmetrical. Other mounting positions and shapes, for instance non-symmetrical shapes, are also possible, for example to adapt to an asymmetric vehicle design.

It is noted that any positions that could lie between the positions 4, 5 and 6 are possible, for instance if the bumper bar hits the obstacle off-center, but somewhere in between the center of the bumper bar and the outer end, which may cause the first bumper shaft 2 to be pushed further inwards to an inner position than the second bumper shaft 3. That would in essence superimpose a rotational motion and a translatory motion of the bumper bar. Within its maximum range that is determined by the maximum movement range of the first and second bumper shafts 2 and 3, the bumper bar 1 may assume any angular position and longitudinal position, depending on how far the first and second bumper shafts are pushed to an inner position.

As will be discussed in more detail, if the bumper bar reaches a certain position, the engine 10 of the vehicle 7 is shut off, for instance by a switch 40 actuated by any of the first and second bumper bars 2 and 3. In addition, by actuating the switch, it is possible to activate a braking mechanism through the control of the autonomous vehicle, braking some or all of the wheels 11 while the vehicle engine 10 has been shut down.

Figure 4:
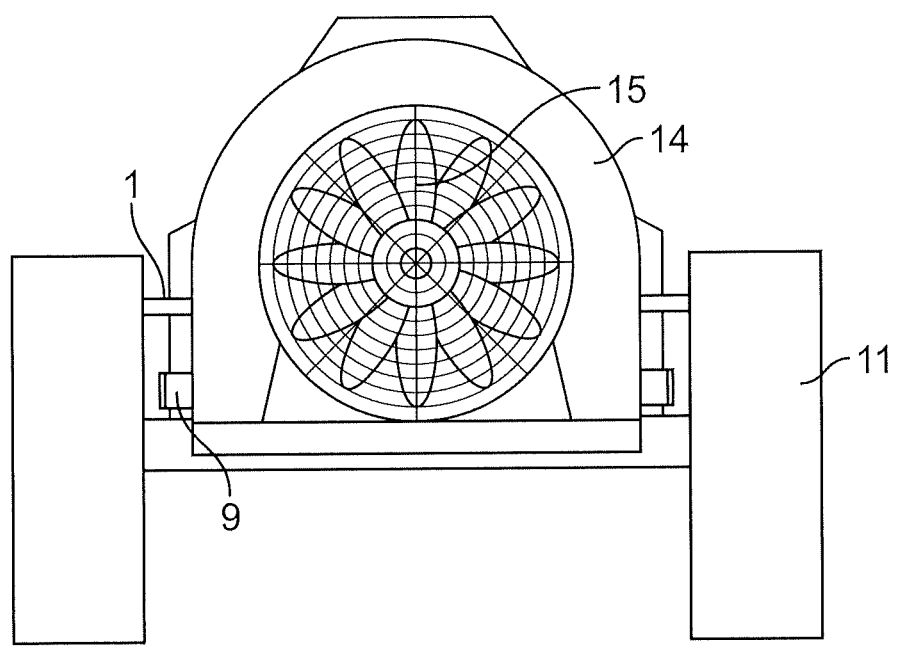
FIG. 4 shows a rear view of the vehicle shown in FIG. 1.

In the case of autonomous agricultural vehicles, movement is typically relatively slow and needs to be controlled within a narrow range to allow the job to be done, for instance spraying of crops like in the incident example. For that purpose, the engine typically drives a hydraulic pump 12, which provides pressured hydraulic oil to drive motors powering the wheels 11. At the rear of the vehicle, a fan housing 14 is provided, better seen in FIG. 4 showing a rear view of the autonomous vehicle. The fan housing 14 houses a fan 15 for generating the spraying air flow distributing spraying agent that is ejected into the air flow through spray nozzles.

Underneath and offset to a more inner position that is closer to the body of the vehicle 7, a second safety bumper 9 is provided. Such a second safety bumper 9 may be of conventional design, include a resilient soft material, and if contacted by an object, caves in by a distance and this way establishes electrical conductivity within the bumper can shut off the engine in various ways known in the prior art.

Figure 2:
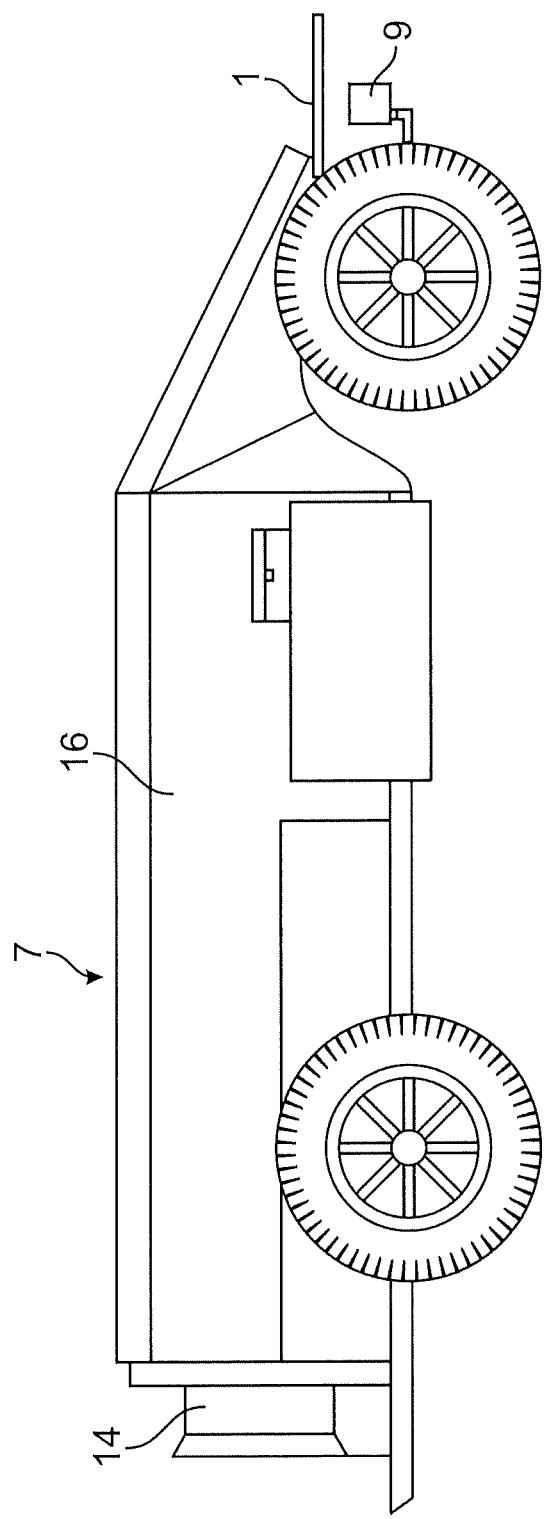
FIG. 2 shows a side view of the vehicle shown in FIG. 1.

The correlation between the bumper bar 1 and the second safety bumper 9 is best seen in FIG. 2 showing a side view of the autonomous vehicle 7. The second safety bumper is either supported at the back or from below, allowing at the front soft material that can be depressed by an object. The purpose of the second safety bumper 9 is to provide a safety shutoff mechanism for low objects while the primary safety shutoff assembly is the one including the bumper bar 1. The reason why the bumper bar 1 is on a more elevated position is particularly to protect persons for which purpose the bumper bar 1 could be for instance waist height. Also, in orchards, branches could form an obstacle that would not be considered by the second safety bumper 9.

Figure 3:
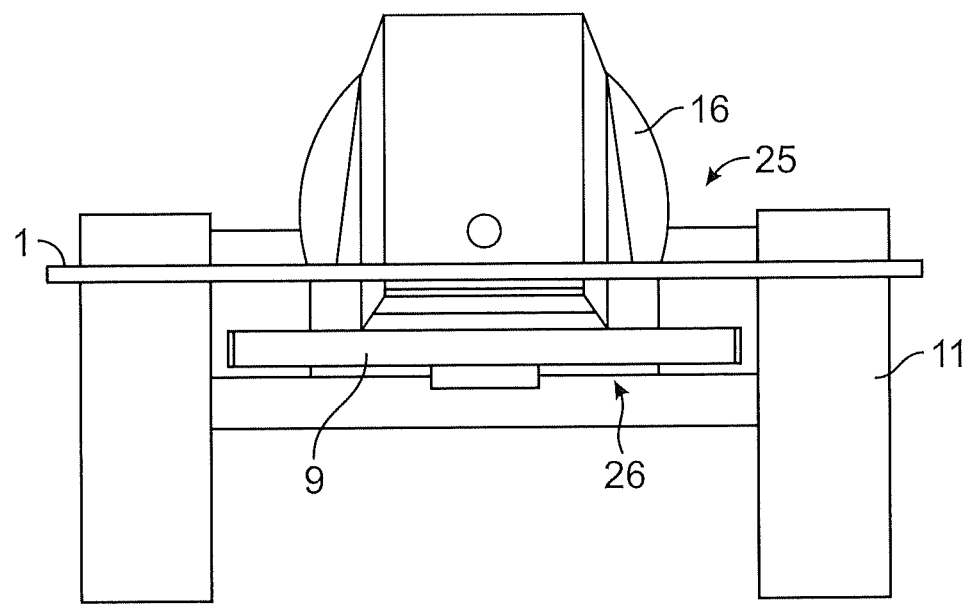
FIG. 3 shows a front view of the vehicle shown in FIG. 1.

FIG. 3 shows the front of the autonomous vehicle 7, including a view of a round middle portion, the part of which holding the spraying agent.

Figure 5:
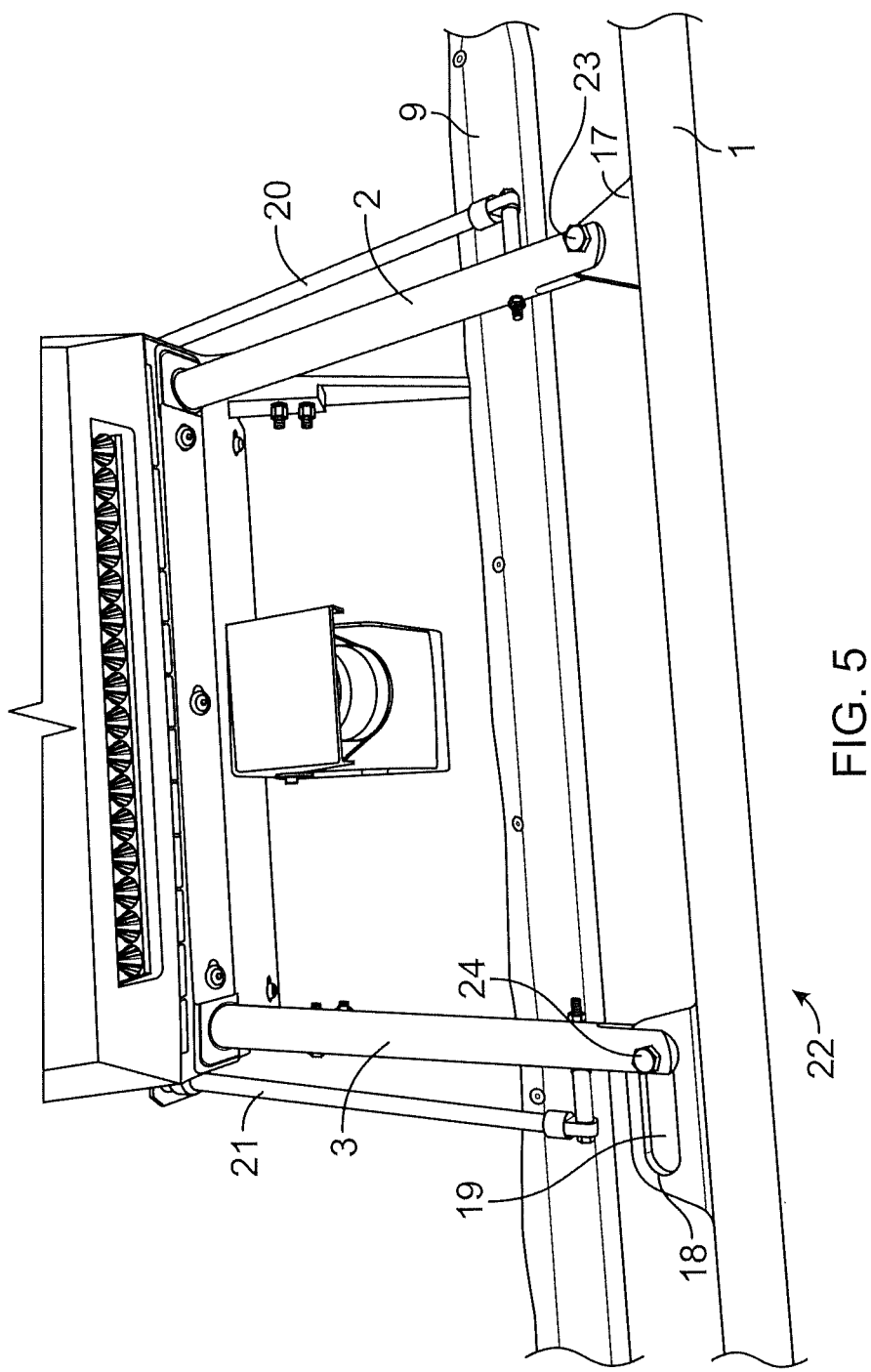
FIG. 5 shows a partial perspective top view of the front of the autonomous vehicle carrying the safety bumper assembly according to the invention, with the bumper bar assuming its neutral position with both the first bumper shaft 2 and second bumper shaft 3 being fully extended to their outermost positions.

FIG. 5 shows a partial perspective top view of the front of the autonomous vehicle carrying the safety bumper assembly 25, 26 according to the invention. The same reference numerals are shown as in FIGS. 1-4. This FIG. 5 shows more details about the specific hinge mechanism hinging the bumper bar 1 to the first bumper shaft 2 and second bumper shaft 3. In this embodiment, a first hinge 17 hinges the bumper bar 1 to the first bumper shaft 2. This first hinge 2 is a simple rotational hinge, allowing only a rotational degree of freedom. The bumper bar 1 is hinged by a second hinge 18 to the second bumper shaft 3. This hinge allows both a rotational and a translatory degree of freedom via the elongated hole 19. This combination of hinges 17 and 18 with different properties has proven to be particularly advantageous, namely holding the bumper bar 1 in its defined outermost and neutral position during normal operation when the bumper bar 1 is not subjected to any external forces or only relatively minor external forces. At the same time, by a first gas strut 20 pushing the first bumper shaft 2 to its outermost position and gas strut 21 pushing the second bumper shaft 3 to its outermost position, the bumper bar 1 is biased into a defined position that can only change if an external force, such as by hitting an object, is exerted on the bumper bar 1, pushing in one or both of the first and second bumper shafts 2 and 3 against the resistance elements in form of the first and second gas struts 20 and 21, respectively. While using an elongated hole 19 for a second, translatory degree of freedom of on one of the first and second bumper shafts 2, 3 with respect to the bumper bar 1 has proven advantageous alternatives are possible, for instance linking the first and/or second bumper shafts 2 and 3 by an elastic material to the bumper bar.

If for instance an external force is exerted on the bumper bar 1 closer to the right side of the vehicle as shown in FIG. 1, which is closer to the second bumper shaft 3 and on the left side in FIG. 5, it is evitable that relatively little force is exerted by the bumper bar 1 on the first bumper shaft 2 in comparison to the second bumper shaft 3 so that at least predominantly only the bumper shaft 3 is pushed inwards, resulting in a mere rotational movement of the bumper bar around the pivot point 23 that is determined by the first hinge 17. The direction of the rotational movement is, in the view according to FIG. 1, in a clockwise direction. At the same time, a translatory movement happens at the second hinge 18, namely of the pivot point 24 moving in FIG. 5 from the right end towards the left end of the elongated hole 19.

Figure 6:
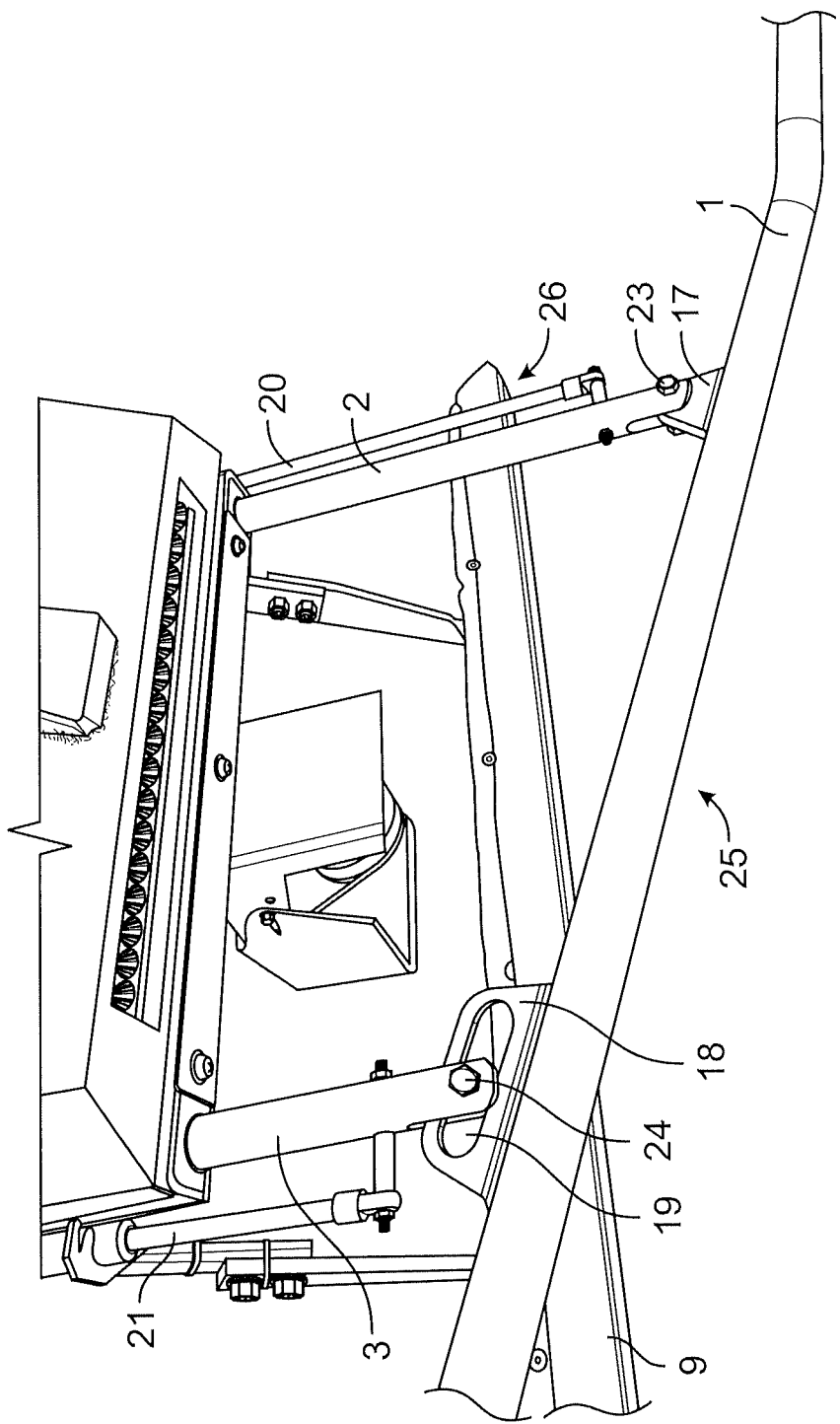
FIG. 6 shows a partial perspective view similar to FIG. 5, with a force acting on the outer region of the bumper bar that is closer to the second bumper shaft being depressed to an inner position while the first bumper shaft remains being biased to its outermost position.

FIG. 6 shows another perspective front view similar to the one shown in FIG. 5, but here in contrast to FIG. 5 with the bumper bar 1 in a position where a force is exerted on the bumper bar 1 at the outer end thereof closer to the second bumper shaft 3. Notably, the second pivot point 24 has moved along the elongated hole 19. The second bumper shaft 3 is pushed in, while the first bumper shaft 2 still assumes at least essentially its outermost position.

Conversely, if an object hits the bumper bar 1 more on the left side of the vehicle 7 according to FIG. 1, namely at the outer end closer to the first bumper bar 2, the bumper bar 1 again pivots around the pivot point 23, this time in the view according to FIG. 1 counterclockwise, while like in the clockwise rotation the pivot point 24 performs a translatory movement along the elongated hole 19 in the drawings shown in FIG. 5 from the right side to the left side. Notably, the movement of the second pivot point 24 within the elongated hole is in both cases going from a position at the end of elongated hole 19 that is closest to the center line 8 toward the opposite end of the elongated hole that is more remote from the center line, regardless of the bumper bar rotating in a clockwise or counterclockwise direction. In the foremost, neutral position of the bumper bar as shown in solid lines in FIG. 1 the pivot point 24 assumes the position at an end of the elongated hole 19 which end is closest to the center line 8. Apart from the first hinge 17 allowing only rotational movement, and defining in connection with the second hinge 18 a 2 point attachment, locating the elongated hole such that a bolt that may form the second pivot point 24 abuts against the centermost end of the elongated hole additionally helps in holding the bumper bar in its foremost, neutral position when the bumper bar 1 is subjected to only minor forces, such as during normal operation.

Figure 7:
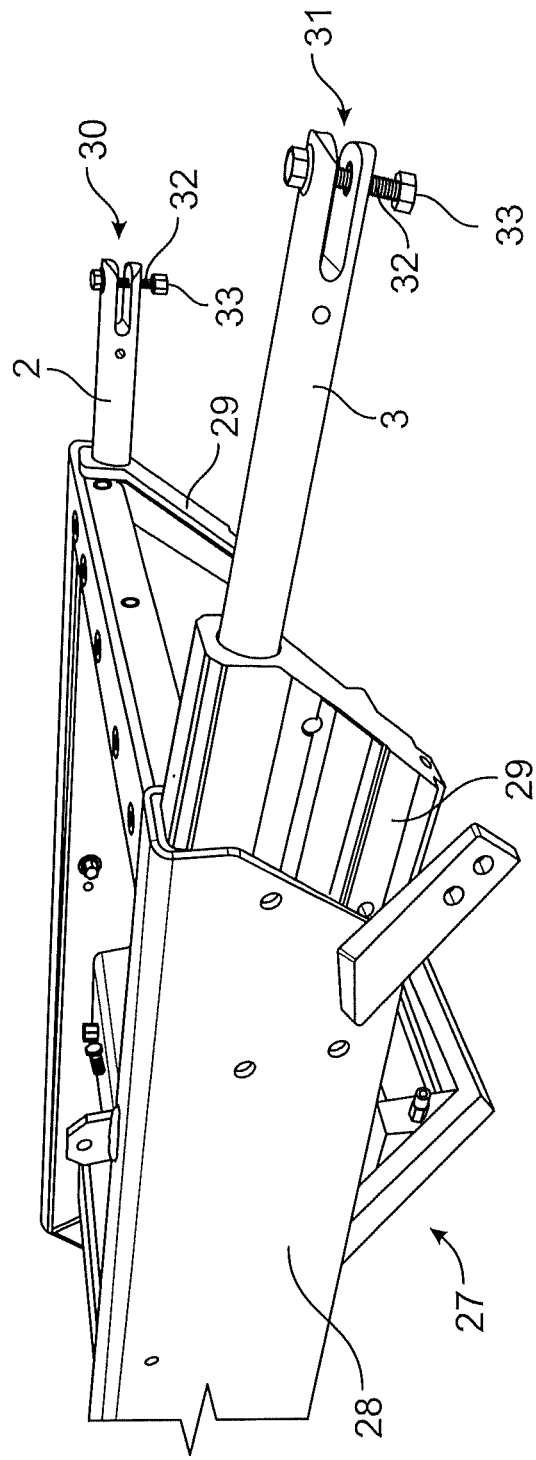
FIG. 7 shows a perspective front view of an embodiment of the support structure as a partial assembly of said safety bumper assembly according to the invention.

FIG. 7 shows a partial assembly showing specifically the support structure 27. This support structure 27 comprises a vehicle frame 28. This vehicle frame 28 may be formed by welding beams such as rectangular profiled beams or U-shaped or T-shaped steel beams together to a vehicle frame 28. The frame 28 accommodates in this example Ultra-high-molecular-weight polyethylene (UHMW) elements 29 connecting to the frame 28 of the vehicle (7) and has built in bushings or bearings to allow for smooth and consistent movement of the bumper. At the side of the frame that is in the drawing plane in front, the UHMW element 29 has not yet been fully pushed into the vehicle frame 28 while the UHMW element 29 shown at back in relation to the drawing plane has been fully pushed into a beam of the vehicle frame 28, assuming its final mounting position. Instead of UHMW elements, many other types of materials may be used, but according to a preferred embodiment, black UHMW is used. It could also be made from aluminum, steel, or any composite plastic. Inside of the housing material, there are bushings or bearings that are pressed or secured in to keep the first and second bumper shafts 2, 3 rigid. These supports structures 27 are rigidly mounted to the vehicle frame 28, and may be bolted to the frame, welded, or molded into the frame casting. The rigidity ensures that if the bumper bottoms out before the machine stops, there will be no structural damage done to the safety bumper assembly 25 or the vehicle frame 27.

The outer shaft ends 30 and 31 of the first bumper shaft 2 and the second bumper shaft 3 are forked at the end and provided with a vertical through bore allowing insertion of bolts or screws. Nuts 33, for instance designed as locknuts, can be screwed onto the bolts or screws 32. When assembling, the bumper bar 1 can be easily fixed to the shafts 2 and 3 by accommodating tabs for the first hinge 17 having a simple through bore and for the second hinge 18 the elongated hole 19 within the forked portion and the ends 30, 31 with the screw penetrating said through bore and the elongated hole 19 and having locknuts screwed on the lower end of the screws 32 allowing enough tolerance for smooth rotation of the bumper bar 1 relative to the bumper shafts 2 and 3.

Figure 8:
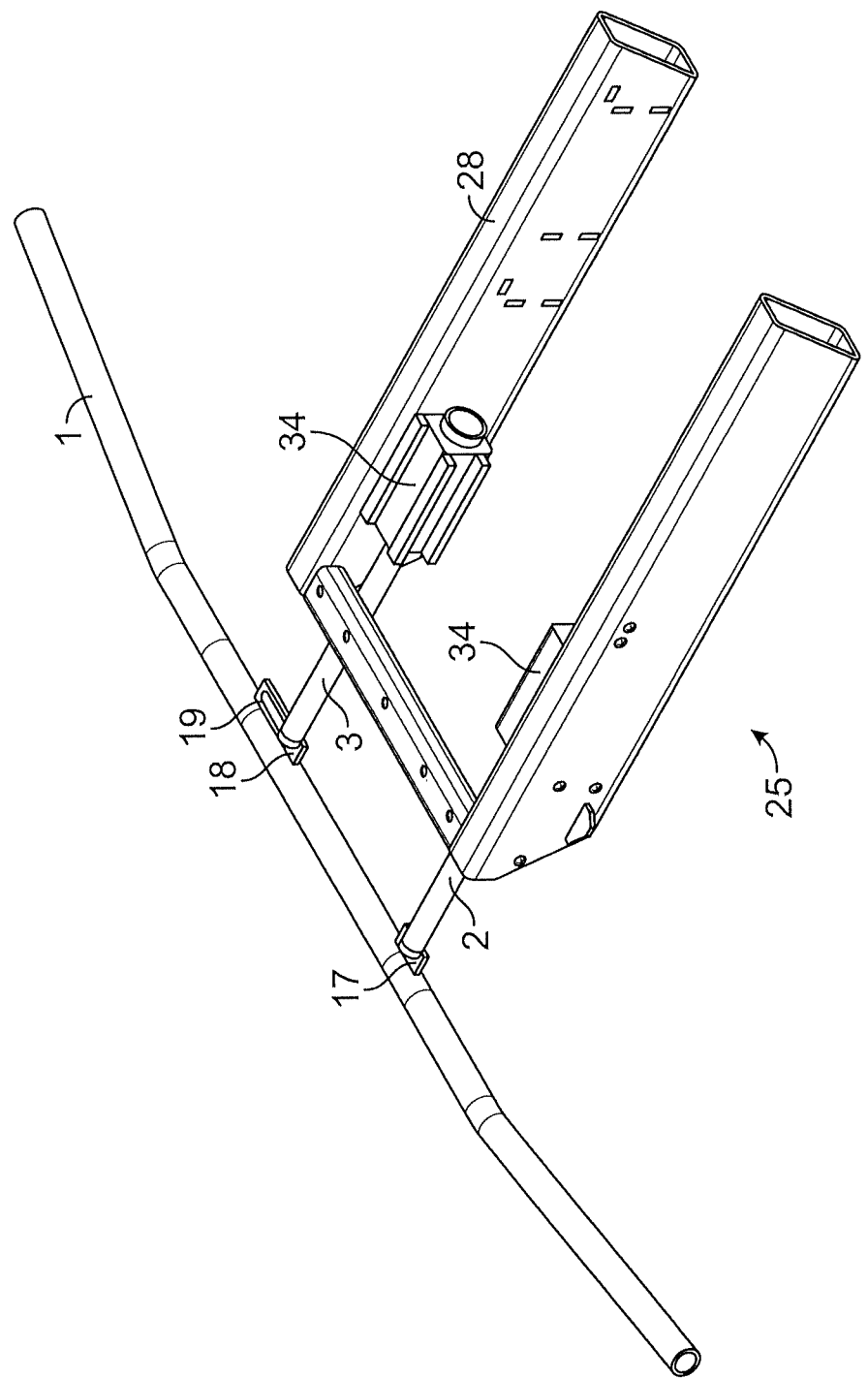
FIG. 8 shows a perspective rear view of an alternative embodiment of the safety bumper assembly according to the invention.
Figure 9:
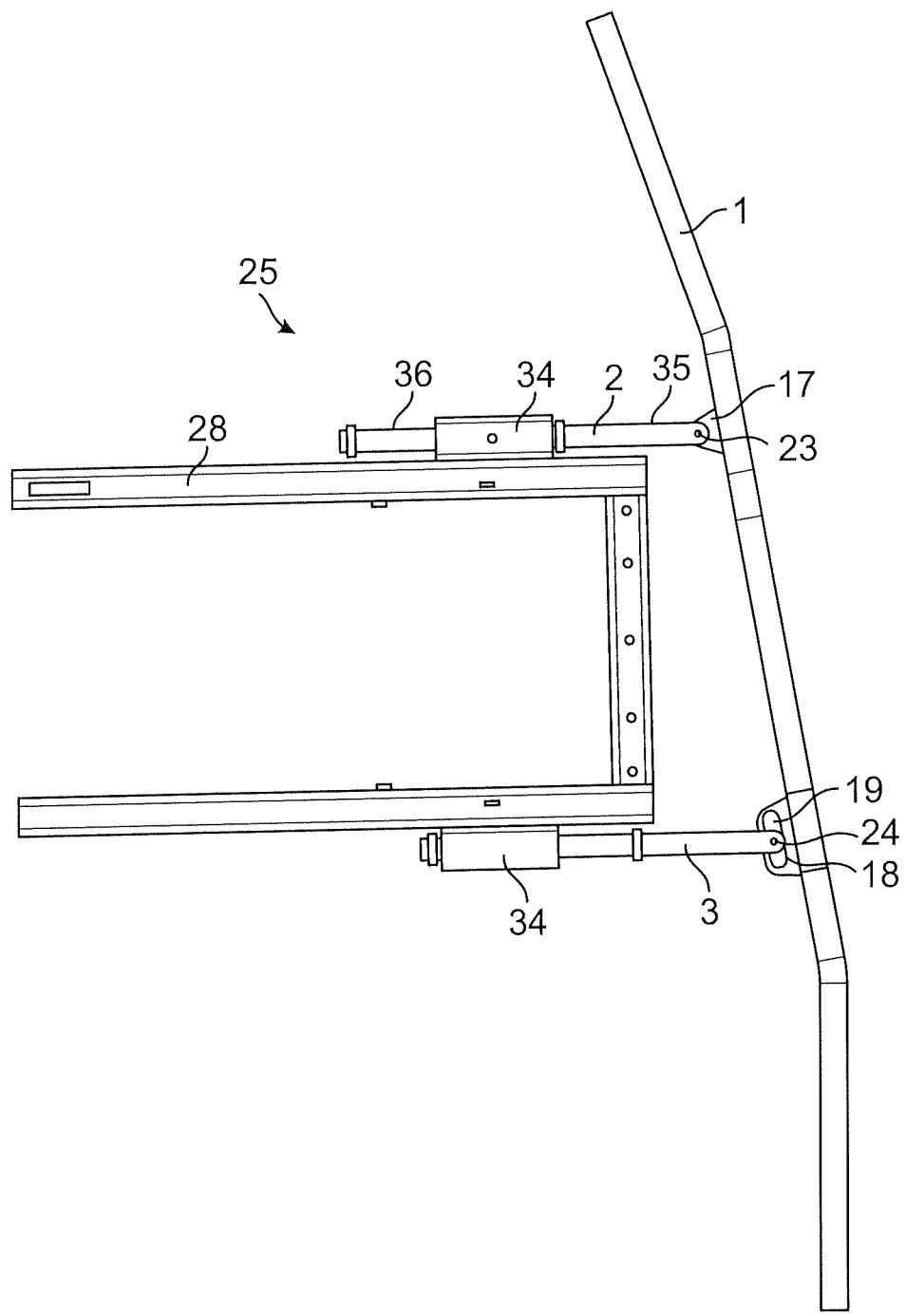
FIG. 9 shows a top plan view of yet another alternative embodiment of the safety bumper assembly according to the invention.

FIGS. 8 and 9 show variances of the bumper assembly 25. In FIG. 8, a perspective rear view of the safety bumper assembly 25, linear ball bearings 34 are attached to an inner wall of the vehicle frame 28. Instead of the vehicle frame 28, it is also possible to provide a separate frame inserted as a whole into the vehicle and attached to the vehicle frame 28.

In contrast to the embodiment shown in FIG. 8, FIG. 9 shows a plan view of another embodiment where the linear ball bearings 34 are attached to outer walls of the frame 28. In FIG. 9, the second bumper shaft 3 still assumes its outermost bumper shaft position, while the first bumper shaft is pushed in. This position is denoted by reference numeral 4 in FIG. 1. In FIG. 9, also the outer bumper shaft portion 35 and the inner bumper shaft portion 36 are shown.

Figure 10:
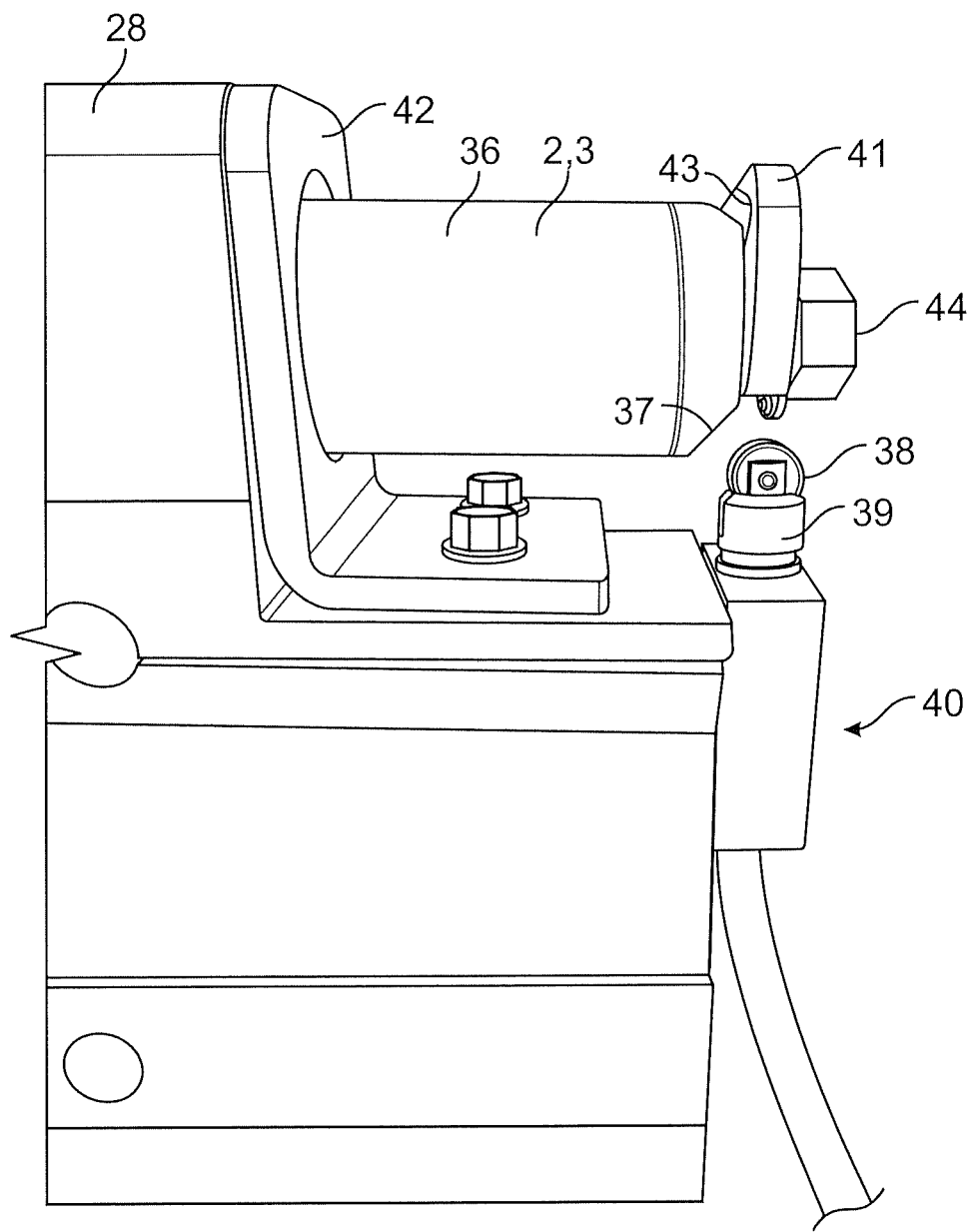
FIG. 10 shows a perspective rear view for one of the bumper shafts including a switch mechanism for shutting down the vehicle engine.

FIG. 10 shows a perspective rear view for the embodiment shown in FIG. 7, there showing a perspective front view. Shown in FIG. 10 is the inner bumper shaft portion 36. It can be designed the same for both the first bumper shaft 2 and the second bumper shaft 3. When the bumper shaft is pushed inwards to an inner position by a certain distance, a chamfered end 37 engages a switch wheel 38 and upon further pushing inwards of the respective first or second bumper shaft 2, 3, the wheel is depressed towards the bottom pushing down a cylinder 39 bearing the switch wheel 38 and therefore actuating the switch 40. Upon actuating the switch 40, the ignition of the engine may be cut off, therefore stopping the engine and consequently the hydraulic pump delivering pressurized hydraulic oil to the vehicle drive motors at the wheels 11. In the alternative or in addition, the switch may actuate a valve, shutting off the hydraulic oil flow to the drive motors. Further, the switch may actuate brakes stopping the wheels 11 of the vehicle from rotating. Such addition braking action may further expedite bringing the autonomous vehicle to a complete stop before the bumper bar 1 has reached its innermost position by having the first bumper shaft 2 and/or the second bumper shaft 3 pushed inwards to their innermost positions.

Further demonstrated in FIG. 10 is a stop plate 41 which may abut against a rear face 42 of the frame 28 or any element attached to the frame 28. This provides a stop for the outermost position of the bumper shafts 2 and 3. The gas struts 20 and 21 or other resistance elements can bias the stop plate 41 against said rear face 42 when the bumper bar 1 assumes its outermost, neutral position. The stop plate 41 could be simply screwed to a rear face 43 of the bumper shaft 2, 3 by a screw 44.

The following is a list of elements by reference numerals
bumper bar 1
first bumper shaft 2
second bumper shaft 3
bumper bar position 4
bumper bar position 5
bumper bar position 6
vehicle 7
centerline 8
second safety bumper 9
vehicle engine 10
wheels 11
hydraulic pump 12
fan housing 14
fan 15
vehicle body 16
first hinge 17
second hinge 18
elongate hole 19
first gas strut 20
second gas strut 21
first pivot point 23
second pivot point 24
first safety bumper assembly 25
first safety bumper assembly 26
support structure 27
vehicle frame 28
ultra-high-molecular-weight polyethylene (UHMW) elements 29
outer shaft ends 30 and 31
screws 32
linear ball bearings 34
outer bumper shaft portion 35
inner bumper shaft portion 36
chamfered end 37
switch wheel 38
cylinder 39
switch 40
stop plate 41
rear face 42
rear face 43
screw 44

The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings, although not every Figure may repeat each and every feature that has been shown in another Figure in order to not obscure certain features or overwhelm the Figure with repetitive indicia. It is understood that the invention is not limited to the specific methodology, devices, apparatuses, materials, applications, etc., described herein; as these may vary. It is also to be understood that the terminology used herein is used for the purpose of describing particular embodiments only, and is not intended to limit the scope of the invention.

What is claimed is:

1. A safety bumper assembly for a vehicle shutting off a vehicle engine when the vehicles hits an obstacle, said safety bumper assembly comprising:
   a bumper bar;
   at least a first bumper shaft and a second bumper shaft, each of which having an outer bumper shaft portion with an outer shaft end and an inner bumper shaft portion spaced from the outer bumper shaft portion and having an inner shaft end, wherein said outer bumper shaft portion is hinged to the bumper bar;
   a support structure accommodating the at least first and second bumper shafts at their respective inner bumper shaft portions in a movable fashion;
   a first resistance element biasing the first bumper shaft and a second resistance element biasing the second bumper shaft to respective outermost positions where said outer bumper shaft ends are spaced by a first distance from the support structure; and
   a switch actuated by inward movement of at least one of the first and second bumper shafts when at least one of the outer bumper shaft ends of the least one of the first and second bumper shafts has reached an inner position that is located at a second distance from the support structure that is shorter than said first distance;

wherein the first bumper shaft and the second bumper shaft are movable relative to each other.

2. The safety bumper assembly according to claim 1, wherein the support structure comprise at least one of linear slide bushings or linear ball bearings supporting the inner bumper portions of the first and second bumper shafts in a linearly slidable fashion with respect to the support structure.

3. The safety bumper assembly according to claim 1, wherein the first bumper shaft is hinged by a first hinge to the bumper bar allowing substantially only a rotational movement between the first bumper shaft and the bumper bar, and the second bumper shaft is hinged by a second hinge to the bumper bar allowing both a rotational and a linear movement between the second bumper shaft and the bumper bar.

4. The safety bumper assembly according to claim 3, wherein said second hinge comprises an elongated hole extending in said outermost position substantially perpendicularly to the respective first and second bumper shafts.

5. The safety bumper assembly according to claim 1, wherein the first and second resistance elements are one of gas struts and springs.

6. The safety bumper assembly according to claim 1, wherein the inner bumper shaft portions of at least one of said first and second bumper shafts have a chamfered end that engages the switch when the at least one of said first and second bumper shafts has moved from their respective outermost position towards the inner position, shutting off the vehicle engine when the respective one of said first and second bumper shafts has reached the inner position.

7. The safety bumper assembly according to claim 1, wherein a first stop element is attached to the inner shaft portion of at least one of the first and second bumper shafts and engages a respective second stop element when at least one of the first and second bumper shaft is biased by the resistance elements to its outermost position.

8. The safety bumper assembly according to claim 7, wherein the first stop element is attached to an end face at the inner end of the at least one of the first and second bumper shafts and abuts against the support structure or vehicle frame or elements attached thereto when at least one of the first and second bumper shafts is biased by the resistance elements to the outermost position.

9. A vehicle comprising the safety bumper assembly according to claim 1, further comprising:
a vehicle engine;
a vehicle frame supporting vehicle wheels;
a vehicle front where the safety bumper assembly is attached in such a position that the bumper bar forms a frontmost vehicle portion when at least one of the first bumper shaft and second bumper shaft assumes its outermost position;
wherein the support structure is integrated into the vehicle frame.

10. The vehicle according to claim 9, wherein the support structure is integrated into the vehicle frame by an Ultra-high-molecular-weight polyethylene (UHMW) element inserted into the vehicle frame, wherein said UWHM element carries at least one of linear slide bushings or linear ball bearings supporting the first and second bumper shafts in a linearly slidable fashion with respect to the UWHM element.

11. The vehicle according to claim 9, wherein the vehicle frame comprises vehicle frame beams extending in the longitudinal direction of the vehicle and the support structure comprises ball bearings attached to the vehicle frame beams.

12. The vehicle according to claim 9, wherein said safety bumper assembly is a first safety bumper assembly and the vehicle further comprises a second safety bumper assembly underneath and closer to the support structure than the bumper bar of the said safety bumper assembly, said second safety bumper assembly comprising a resilient soft material that is compressed when coming into contact with an obstacle, wherein a switch is actuated in the compressed state of the second bumper assembly shutting off the vehicle engine.

13. A method of operating a vehicle according to claim 9, comprising:
upon the bumper bar contacting an obstacle, actuating a switch shutting off the vehicle engine, wherein the switch is actuated by inward movement of at least one of the first and second bumper shafts when at least one of the outer bumper shaft ends of the least one of the first and second bumper shafts has reached an inner position that is located at a second distance from the support structure that is shorter than said first distance; and
stopping the vehicle in its entirety before a respective one of the outer bumper shaft ends of the at least one of said first and second bumper shafts has reached its innermost position.

14. The method according to claim 13, further compromising upon the bumper bar contacting an obstacle off-center with respect to the vehicle, moving only the bumper shaft of said first and second bumper shafts that is closest to a position where the bumper bar contacts an object from its outermost position to the inner position, while the respective other one of the first and second bumper shafts remains substantially in its outermost position.

15. The method according to claim 13, further compromising upon the bumper bar contacting an obstacle off-center with respect to the vehicle, moving both said first and second bumper shafts inwards from their outermost positions to an inner position, wherein the bumper shaft of the first and second bumper shafts that is closest to a position where the bumper bar contacts an object is pushed inwards by a longer distance to an inner position than the other of said first and second bumper shafts that is more remote from the location where the where the bumper bar contacts the object.

* * * * *